(12) United States Patent
Li et al.

(10) Patent No.: US 6,995,889 B2
(45) Date of Patent: Feb. 7, 2006

(54) OPTICAL REFLECTING DEVICE

(75) Inventors: Zili Li, Barrington, IL (US); Dmitry Voloschenko, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/420,615

(22) Filed: Apr. 22, 2003

(65) Prior Publication Data

US 2004/0212865 A1 Oct. 28, 2004

(51) Int. Cl.
*G02B 26/08* (2006.01)

(52) U.S. Cl. ...................... 359/223; 359/196
(58) Field of Classification Search ........ 359/223–226, 359/196, 114, 212, 220; 356/328
See application file for complete search history.

(56) References Cited

U.S. PATENT DOCUMENTS 6,201,629 B1 * 3/2001 McClelland et al. ........ 359/223
6,639,713 B2 * 10/2003 Chiu et al. .................. 359/318
2004/0061917 A1 * 4/2004 Mushika et al. ............ 359/223

* cited by examiner

*Primary Examiner*—Drew A. Dunn
*Assistant Examiner*—Joshua L Pritchett

(57) ABSTRACT

An optical reflecting device employs an interfacing of an optical refractor and an optical reflector. When incorporated within a system (e.g., an optical switch, a display, and a bar code scanner), the optical reflecting device can be rotated among a plurality of positions. At a first position of the optical reflecting device, a light beam entering the optical reflecting device is sequentially refracted by the optical refractor, reflected by the optical reflector and refracted by the optical refractor prior to exiting the optical reflecting device at a first exit angle of the light beam from a normal axis of the optical reflector. Upon a rotation of the optical reflecting device by a rotation angle to a second rotation position, the light beam exits the optical reflecting device at a second exit angle of the light beam from the normal axis of the optical reflector at the first rotation position. An absolute value of a difference between the first and second exit angles is greater than twice an absolute value of the rotation angle.

14 Claims, 3 Drawing Sheets

US 6,995,889 B2

OPTICAL REFLECTING DEVICE

FIELD OF THE INVENTION

The present invention generally relates to micro electro-mechanical system ("MEMS") based optical devices, including meso-MEMS type devices. The present invention specifically relates to a simple structure to increase the beam steering angular range of an optical switch for the purpose of making smaller switches and lower signal noise ratio for the switches.

BACKGROUND OF THE INVENTION

Optical switches, displays and bar code scanners as known in the art are often designed with reflective mirrors as an integral part of the system. Such components often have the reflective mirror on a cantilevered or bridged structure whereby the reflective mirror is rotated as the structure is rotated. The amplitude of rotation is about no more than ±10°, which limits applicability of MEMS-based technologies. FIGS. 1 and 2 illustrate the concept behind the operation of a prior art reflective mirror 10, which has an upwardly facing and planar reflective surface with a normal axis NA. As illustrated in FIG. 1, an incident light beam IB incident on the reflective surface of the reflective mirror 10 at an incident angle $\theta_1$ from the normal axis NA is reflected as reflected light beam RB at a reflective angle $\theta_1$ from the reflecting surface of reflective mirror 10. When the mirror 10 is rotated by an angle $\theta_2$ around a pivot point P1 as illustrated in FIG. 2, the reflected light beam RB is reflected at a reflective angle $\theta_1+2\theta_2$ with respect to the normal axis NA prior to the rotation of mirror 10. In some applications involving reflective mirror 10, it is imperative that the reflective angle of reflected light beam RB is greater than $\theta_1+2\theta_2$ when mirror 10 is rotated around pivot point P by angle $\theta_2$.

SUMMARY OF THE INVENTION

One form of the present invention is an optical reflecting device comprising an optical refractor and an optical reflector interfaced with the optical refractor. The optical reflecting device can be rotated among a plurality of positions. A light beam entering the optical reflecting device is sequentially refracted by the optical refractor, reflected by the optical reflector and refracted by the optical refractor prior to exiting the optical reflecting device. At a first rotation position of the optical reflecting device, the light beam exits the optical reflecting device at an exit angle relative to a normal axis of the optical reflector at the first rotation position. Upon a rotation by a rotation angle of the optical reflecting device to a second rotation position, the light beam exists the optical reflecting device at a second exit angle of the light beam from the normal axis of the optical reflector at the first rotation position. An absolute value of a difference between the first and second exit angles is greater than twice an absolute value of the rotation angle.

A second form of the present invention is a method of operating an optical reflecting device. At a first rotation position, the optical reflecting device sequentially refracts a light beam entering the optical reflecting device, reflects the light beam within the optical reflecting device, and refracts the light beam upon the light beam exiting the optical reflecting device. The light beam exits the optical reflecting device at a first exit angle relative to a normal axis of the optical reflecting device at the first rotation position. The optical reflective device is subsequently rotated from the first rotation position to a second rotation position by a rotation angle. At the second rotation position, the optical reflecting device sequentially refracts the light beam entering the optical reflecting device, reflects the light beam within the optical reflecting device, and refracts the light beam upon the light beam exiting the optical reflecting device. The light beam exits the optical reflecting device at a second exit angle relative to the normal axis of the optical reflecting device at the first rotation position. The absolute value of a difference between the first exit angle and the second exit angle is greater than twice an absolute value of the rotation angle.

The foregoing forms as well as other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention is illustrated by way of example in the accompanying figures, in which like references indicate similar elements, and in which.

Figure 3:
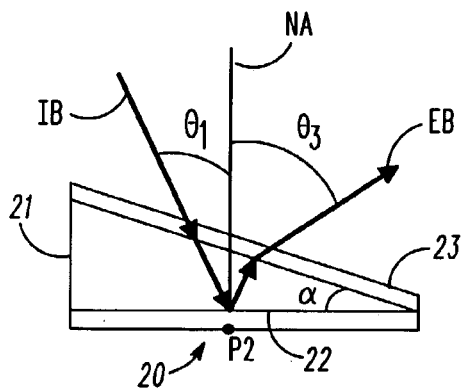
FIGS. 3–6 illustrate an exemplary operation of a first embodiment of an optical reflecting device in accordance with the present invention.
Figure 4:
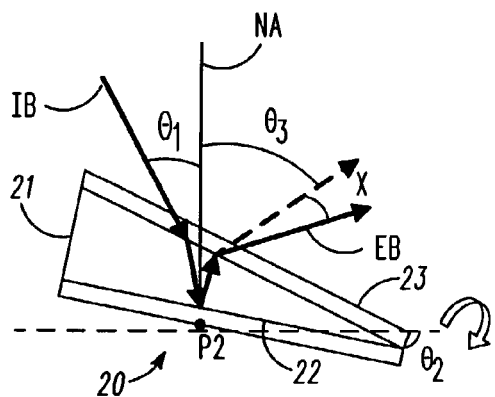
Figure 5:
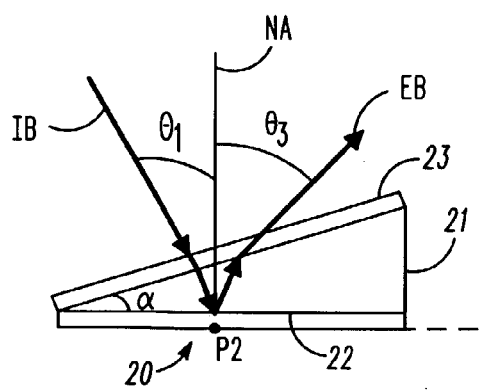
Figure 6:
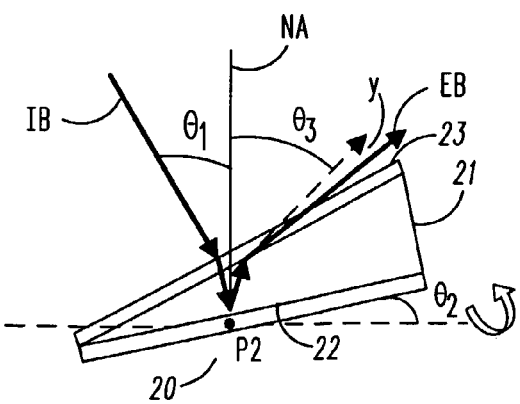
Figure 7:
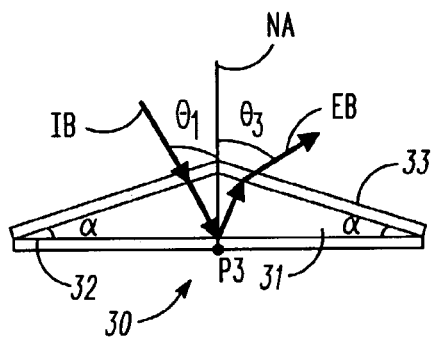
Figure 8:
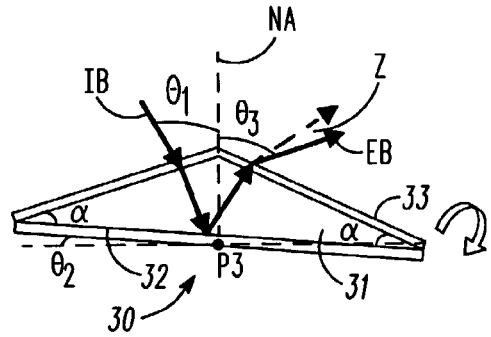
Figure 9:
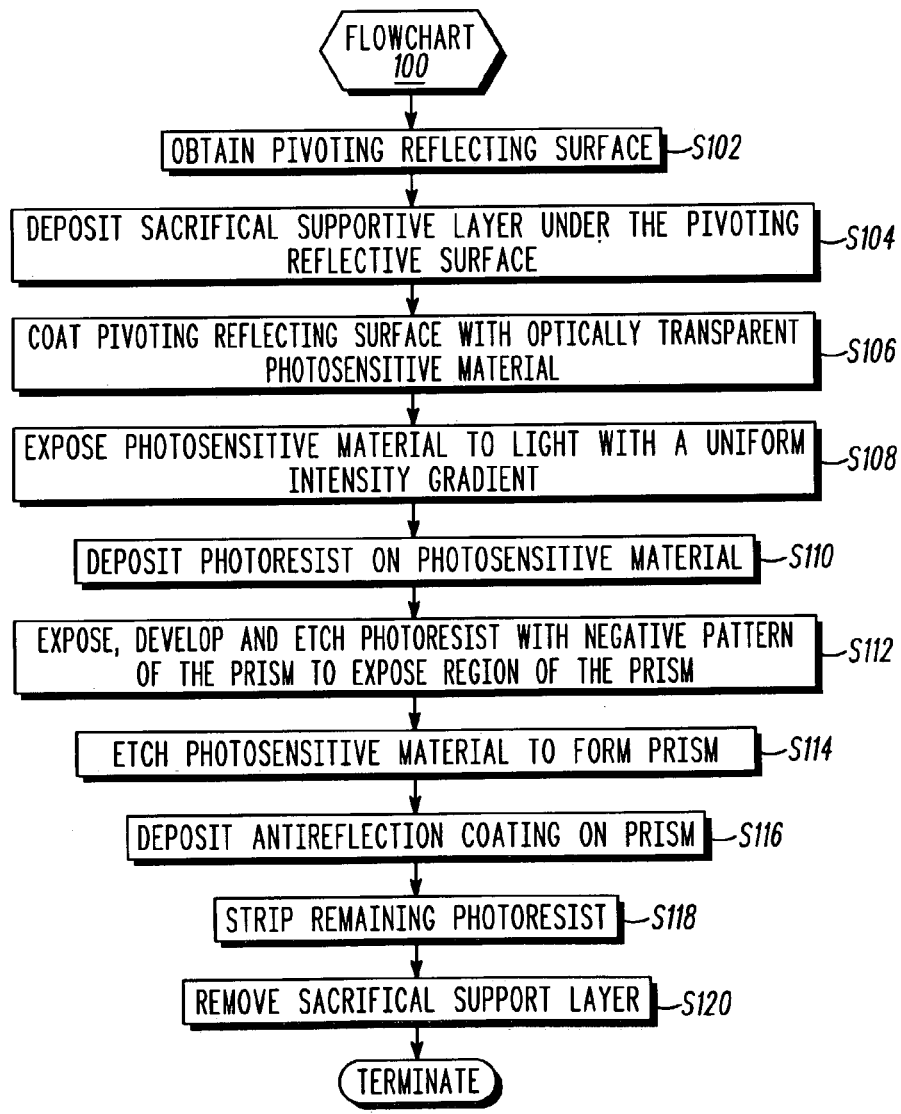
Figure 10:
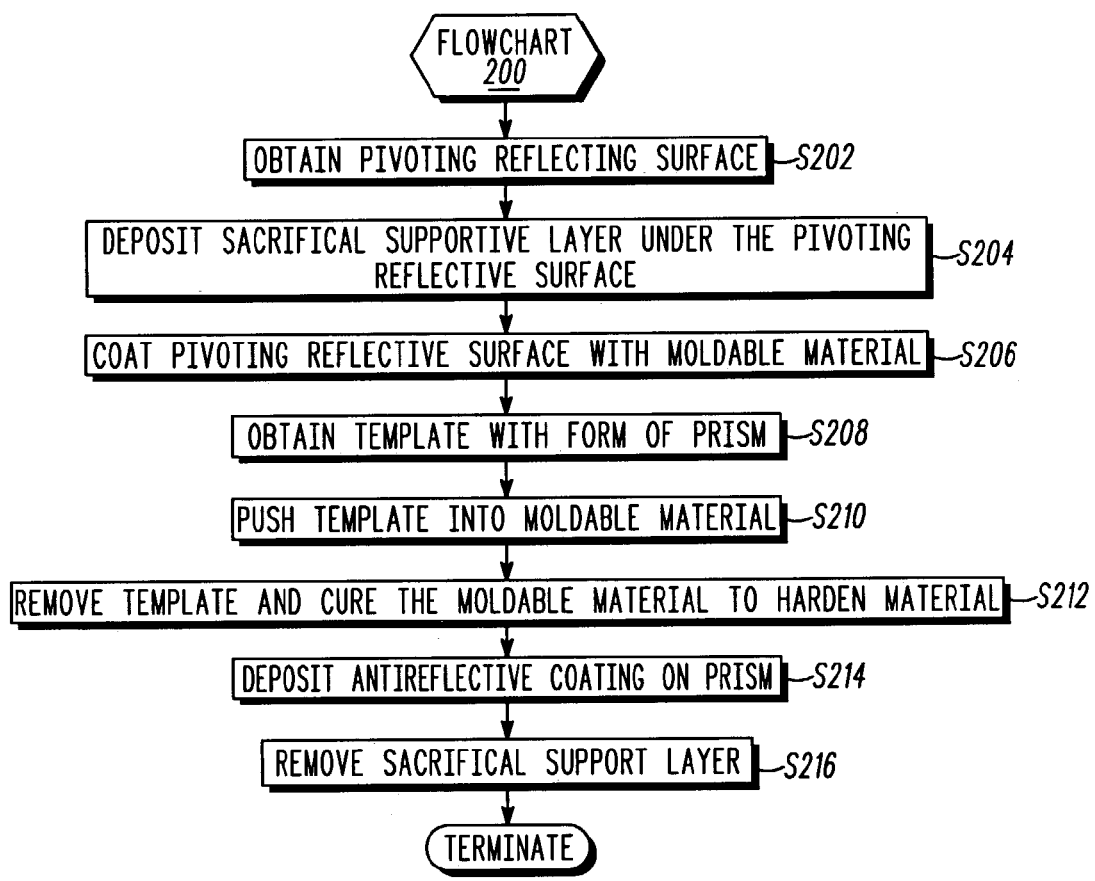

TABLE 1 illustrates a set of parameters, which satisfy the conditions of the optical reflecting device illustrated in FIGS. 3 and 4, in accordance with the present invention;

TABLE 2 illustrates a set of parameters, which satisfy the conditions of the optical reflecting device illustrated in FIGS. 5 and 6, in accordance with the present invention;

FIGS. 7 and 8 illustrate an exemplary operation of a second embodiment of an optical reflecting device in accordance with the present invention;

FIG. 9 illustrates a flowchart representative of a first embodiment of an optical reflecting device fabrication method in accordance with the present invention; and FIG. 10 illustrates a flowchart representative of a second embodiment of an optical reflecting device fabrication method in accordance with the present invention.

DETAILED DESCRIPTION OF THE PRESENTLY PREFERRED EMBODIMENTS

FIGS. 3 and 4 illustrate an optical reflecting device 20 that can be incorporated in many systems as a component of a rotating mechanism, such as, for example, a MEMS based optical switch disclosed in U.S. patent application Ser. No. 10/420,078, entitled "Optical Switch Providing A Bi-Directional Rotation Of An Optical Reflector" and filed concurrently herewith, the entirety of which is hereby incorporated by reference.

Figure 1:
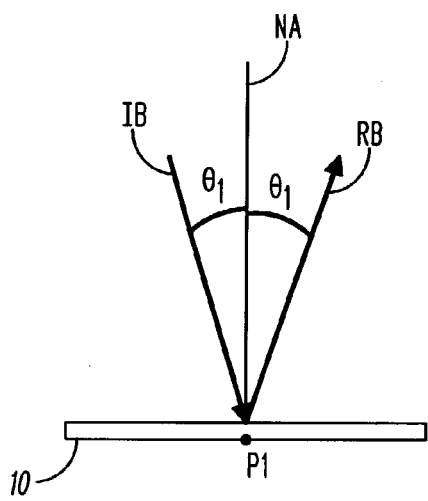
FIGS. 1 and 2 illustrate an exemplary operation of a prior art optical reflector.
Figure 2:
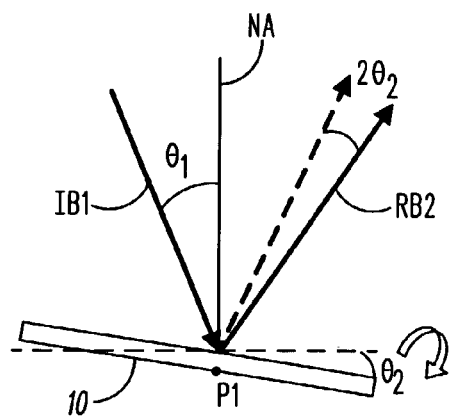

The present invention configures optical reflecting device 20 to achieve a better differentiation among light beams entering and exiting optical reflecting device 20 as compared to light beams that enter and exit prior art reflective mirror 10 (FIGS. 1 and 2). To this end, optical reflecting device 20 employs an interfacing of an optical refractor in the form of an optically transparent prism 21 and an optical reflector in the form of a reflective mirror 22. The tip of prism 21 is that portion of the prism 21 having the smallest angle, which is illustrated as α in FIGS. 3–6. As an optional feature, for better performance, optical reflecting device 20 further employs an anti-reflection coating 23 on prism 21.

In operation, upon entering optical reflecting device 20, light beam IB is sequentially refracted by prism 21, reflected by optical reflector surface 22, and refracted by prism 21 as illustrated in FIGS. 3 and 4. In a first position of this embodiment as illustrated in FIG. 3, incident light beam IB enters optical reflecting device 20 at an entrance angle $\theta_1$ from the normal axis NA of reflective mirror 22 and light beam IB exits optical reflecting device 20 as an exit light beam EB at an angle $\theta_3$ from the normal axis NA of reflective mirror 22. To reduce Fresnel reflection losses, light beam IB is preferentially polarized perpendicular to the plane of incidence defined by normal axis NA and light beam IB.

When optical reflecting device 20 is rotated by angle $\theta_2$ around a pivot point P2 in a plane containing incident light beam IB and exit light beam EB and the incident trajectory of light beam IB remains unchanged as illustrated in FIG. 4, exit light beam EB exits optical reflecting device 20 at an exit angle ($\theta_3$+X) from the normal axis NA of reflective mirror 22 prior to the rotation of optical reflecting device 20. The rotation angle $\theta_2$ must be in the direction that causes the tip of prism 21 to drop below a plane perpendicular to the normal axis NA that is represented by the dashed line illustrated in FIG. 4. The normal axis NA is shown as being unrotated in FIG. 4 for ease of comparison. As the tip of prism 21 drops, a surface of prism 21 opposing the tip of prism 21 rises above the plane perpendicular to the normal axis NA.

Upon rotation of optical reflecting device 20 as illustrated in FIG. 4, exit beam EB has an exit angle ($\theta_3$+X), where the angle X is greater than the angle $2\theta_2$ (FIGS. 2, 4), where X for this embodiment is described mathematically in accordance with the following equations [1]–[4]:

$$X = \theta_2 + A - B \quad [1]$$

$$A = \sin^{-1}\left\{\sin(\theta_1 + \alpha + \theta_2) \cdot \cos 2\alpha - \sqrt{\frac{n_p^2}{n_a^2} - \sin^2(\theta_1 + \alpha + \theta_2)} \cdot \sin 2\alpha\right\} \quad [2]$$

$$B = \sin^{-1}\left\{\sin(\theta_1 + \alpha) \cdot \cos 2\alpha - \sqrt{\frac{n_p^2}{n_a^2} - \sin^2(\theta_1 + \alpha)} \cdot \sin 2\alpha\right\} \quad [3]$$

$$-\frac{\pi}{2} \leq \theta_1 + \alpha \leq \frac{\pi}{2} - \theta_2, \theta_2 \geq 0 \quad [4]$$

For equations [1]–[4], $n_p$ is an index of refraction of prism 21, $n_a$ is an index of refraction of air, and α is the smallest angle of prism 21. In accordance with this invention, the following TABLE 1 is an exemplary listing of parameter sets that satisfy the condition that X is greater than $2\theta_2$, so that an increase in the steering range compared to that of in the prior art is achieved:

TABLE 1

| α | $\theta_1$ | $\theta_2$ |
|---|---|---|
| 9 deg | 0 to 7 deg | 0 to 5 deg |
| 8 deg | 0 to 6 deg | 0 to 5 deg |
| 7 deg | 0 to 5 deg | 0 to 5 deg |

TABLE 1-continued

| α | $\theta_1$ | $\theta_2$ |
|---|---|---|
| 6 deg | 0 to 3 deg | 0 to 5 deg |
| 5 deg | 0 to 2 deg | 0 to 5 deg |

The index of refraction is $n_p$=1.5 for all the parameter sets in Table 1. For example, when α is 8 degrees and $\theta_2$ is between 0 degrees and 5 degrees, then angle $\theta_1$ can be no more than 6 degrees to obtain the condition X is greater than $2\theta_2$.

FIGS. 5 and 6 illustrate a second orientation of optical reflecting device 20 relative to incident light beam IB in which incident light beam IB approaches prism 21 from the opposite side of the normal axis NA of reflective mirror 22 from that illustrated in FIGS. 3 and 4. FIG. 5 illustrates optical reflecting device prior to rotation, and FIG. 6 illustrates a rotation of optical reflecting device 20 by rotation angle $\theta_2$ about pivot point P2 while the incident trajectory of incident light beam IB remains unchanged. As described for FIGS. 3 and 4, the rotation of $\theta_2$ degrees of prism 21 must be in the plane containing incident light beam IB and exit light beam EB, and in the direction which causes the tip of prism 21 to drop below the plane perpendicular to the normal axis NA with a concurrent rising of the prism surface opposing the tip of prism 21. Upon rotation of optical reflecting device 20 as illustrated in FIG. 6, exit beam EB has an exit angle ($\theta_3$+Y), where Y is greater than reflective angle $2\theta_2$ (FIGS. 2, 6) and where Y is described mathematically in accordance with the following equations [5]–[8]:

$$Y = \theta_2 + C - D \quad [5]$$

$$C = \sin^{-1}\left\{\sin(\theta_1 - \alpha) \cdot \cos 2\alpha + \sqrt{\frac{n_p^2}{n_a^2} - \sin^2(\theta_1 - \alpha)} \cdot \sin 2\alpha\right\} \quad [6]$$

$$D = \sin^{-1}\left\{\sin(\theta_1 - \alpha - \theta_2) \cdot \cos 2\alpha + \sqrt{\frac{n_p^2}{n_a^2} - \sin^2(\theta_1 - \alpha - \theta_2)} \cdot \sin 2\alpha\right\} \quad [7]$$

$$-\frac{\pi}{2} + \theta_2 \leq \theta_1 - \alpha \leq \frac{\pi}{2} \quad [8]$$

Again, $n_p$ is an index of refraction of prism 21, $n_a$ is an index of refraction of air, and α is the smallest angle of prism 21.

Values of X and Y for the first and second configurations can be larger than the value of $2\theta_2$ for a range of parameters. In accordance with this invention, Table 2 is an exemplary listing of parameter sets that satisfy the condition that Y is greater than $2\theta_2$, so that an increase in the steering range compared to that of in the prior art is achieved:

TABLE 2

| α | $\theta_1$ | $\theta_2$ |
|---|---|---|
| 9 deg | 0 to 27.9 deg | 0 to 4 deg |
| 8 deg | 0 to 31.5 deg | 0 to 4 deg |
| 7 deg | 0 to 35.1 deg | 0 to 4 deg |
| 6 deg | 0 to 39.6 deg | 0 to 4 deg |
| 5 deg | 0 to 44.1 deg | 0 to 4 deg |

The index of refraction is $n_p$=1.5 for all the parameter sets in Table 2. For example, when α is 9 degrees and $\theta_2$ is between 0 degrees and 4.0 degrees, then angle $\theta_1$ can be no more than 27.9 degrees to obtain the condition Y is greater than $2\theta_2$.

FIG. 7 illustrates an optical reflecting device 30 that can be incorporated in many systems as a component of a rotating mechanism, such as, for example, the MEMS based optical switch disclosed in U.S. patent application Ser. No. 10/420,078, entitled "Optical Switch Providing A Bi-Directional Rotation Of An Optical Reflector". Optical reflecting device 30 employs an interfacing of an optical refractor in the form of prism 31 and an optical reflector in the form of a reflective mirror 32. The cross section of prism 31 is an equilateral triangle with angles α opposing the equal sides of prism 31. Prism 31 is preferably coated with an antireflection coating 33. As with optical reflecting device 20 (FIGS. 3–6), incident light beam IB is refracted by prism 31, then reflected by from reflective mirror 32, and then refracted by prism 31 whereby incident light beam IB exits optical reflecting device as exit light beam EB.

FIG. 8 illustrates optical reflecting device 30 after rotation by rotation angle $\theta_2$ around a pivot point P3, which is opposite an apex of prism 31. The rotation of optical reflecting device 30 must be in the plane containing the incident light beam IB and the exit light beam EB.

The angle Z between a exit light beam EB of FIG. 8 and the exit light beam EB of FIG. 7, which is indicated in FIG. 8 as a dashed arrow, can be greater than $2\theta_2$ providing an increase in the steering range compared to that of in the prior art. The equations to describe angle Z can be obtained by combining the equations [1] through [8] as would be appreciated by one of ordinary skill in the art.

Different MEMS type devices have various ranges of rotation $\theta_2$ about pivot point P. It is desirable to design the prism 21 of FIGS. 2–6 and the prismatic structure 31 of FIGS. 7 and 8 to provide for the widest range of rotation. Those of ordinary skill in the art will appreciate the angles α of prism 21 and prism 31, the index of refractions of prism 21 and prism 31, and the incident angles into the prism 21 or prism 31 must be considered when designing a system to provide the widest range of rotational motion for a given rotational system, such as a rotational MEMS device.

When the optical reflecting devices 20 and 30 of FIGS. 3–8 are placed on a cantilever beam, they will not be centered on the pivot points P2 and P3, respectively. In that case the extent of the prism 21 and 31, respectively, must be long enough to allow for the light beam IB (FIGS. 3–8) to be incident on the prisms 21 and 31, when the cantilever beam is rotated. There will be an offset in the position of the exit beam EB (FIGS. 3–8), which the system can be designed to accept as is known to those of ordinary skill in the art. The light beam IB can be incident on the pivot points P2 and P3 for a rotating bridge structure.

FIG. 9 illustrates a flowchart 100 representative of the fabrication method for fabricating optical reflecting device 20 (FIGS. 3–6) and optical reflecting device 30 (FIGS. 7 and 8) as well as other embodiments of an optical reflecting device in accordance with the present invention. To facilitate an understanding of flowchart 100, the following description of flowchart 100 will be based on a fabrication of optical reflecting device 20.

An implementation of flowchart 100 can be carried out by conventional techniques as will be appreciated by those having ordinary skill in the art. During a stage S102 of flowchart 100, reflective mirror 22 is obtained. In one embodiment, reflective mirror 22 is part of an array of reflecting surfaces on a chip or wafer. The wafer will have been previously processed to form a cantilevered beam or a suspended mirror or the like. During a stage S104 of flowchart 100, reflective mirror 22 is supported from below by a sacrificial material deposited by either spin-coating or an off-set screen printing. In one embodiment, a top of reflective mirror 22 is open with no sacrificial material on it. Preferably, the whole chip or wafer surface parallel with reflective mirror 22 is planar. Silicon wafers are typically used for such devices.

During a stage S106 of flowchart 100, a top surface of reflective mirror 22 is coated with an optically transparent photosensitive material such as, for example, a polyimide or polyimide acid. During a stage S108 of flowchart 100, the photosensitive material is exposed to a beam of light with a gradation of intensity, which can be done through a grayscale photo-mask, so that, upon etching, the photosensitive material will be beveled with the required thickness gradation to form the desired prism 21. During stages S110 and S112 of flowchart 100, the photosensitive material layer will be coated with photoresist and subsequently exposed, developed and etched to open the photoresist exposing only the regions of the photosensitive material where the prisms are to be etched. During a stage S114 of flowchart 100, the photosensitive material is etched with tetramethyl ammonium hydroxide or any other etching agent known to those skilled in the art to form the prism 21.

In order to prevent multiple reflections from a top surface of prism 21 and reflective mirror 22, top surface of prism 21 is coated with an antireflection layer 23, during a stage S116 of flowchart 100. The design of antireflection coatings is know to those of ordinary skill in the art. In one embodiment, antireflection layer 23 is coated only upon portions of prism 21 upon which incident light beam IB will enter optical reflecting device 20.

During a stage S118 of flowchart 100, the photo resist is stripped along with the overlying antireflection. Finally, during a stage S120 of flowchart 100, the sacrificial layer with the overlying photosensitive material is removed by etching in tetramethyl ammonium hydroxide or any other etching agent known to those skilled in the art. The result leaving a prism device 20, an array of prism devices 20, a prismatic structure 30 or an array of prismatic structures 30.

FIG. 10 illustrates a flowchart 200 representative of the fabrication method for fabricating optical reflecting device 20 (FIGS. 3–6) and optical reflecting device 30 (FIGS. 7 and 8) as well as other embodiments of an optical reflecting device in accordance with the present invention. To facilitate an understanding of flowchart 200, the following description of flowchart 200 will be based on a fabrication of optical reflecting device 20.

An implementation of flowchart 200 can be carried out by conventional techniques as will be appreciated by those having ordinary skill in the art. A stage 202 of flowchart 200, like stage 102 (FIG. 9), requires obtaining reflective mirror 22. During a stage S204 of flowchart 200, reflective mirror 22 is supported from below by the deposition of a sacrificial material by either spin-coating or off-set screen printing. In this case, the top surface of the coated wafer, after application of the sacrificial material, must be parallel with the reflecting surface and planar for the template to work well. During a stage S206 of flowchart 200, the planar surface of reflective mirror 22 is coated with a moldable material, such as, for example, a polymethylmethacrylate (PMMA). During a stage S208 of flowchart 200, an appropriate template containing properly positioned indents in the form of the desired prism 21 or prismatic structure 31 is obtained. During a stage S210 of flowchart 200, this template is pushed into the moldable material to form the prism 21.

Appropriate design of the template, known to those having ordinary skill in the art, will allow for the extrusion of the unnecessary moldable material.

During a stage S212 of flowchart 200, the template is removed and the moldable material is cured to form a hard, optically transparent material in the shape of the desired prism 21. If the material is polymethylmethacrylate (PMMA), or polycarbonate, then heating will cure the material. If the moldable material is UV curable resin, then UV light will cure it. During a stage S214 of flowchart 200, anti-reflection coating 23 is coated on the wafer. Finally, during a stage S216 of flowchart 200, the sacrificial material is removed by etching.

The stages described above embody two fabrication processes for the optical reflecting devices 20 and 30 as well as other embodiments of an optical reflecting device constructed in accordance with the present invention. The stages above described a method to fabricate bridge or cantilever beam structures using MEMS technology on wafer. In these types of structures, the reflective mirror 22 may actually be the top surface of the bridge or cantilever beam, which may typically be a silicon surface, as known to those of ordinary skill in the art. If desired, the prism 21 can be formed separately and later secured onto a reflecting surface of reflective mirror 22, by a coupling agent to enhance bonding/adhesion between prism 21 and the reflecting surface of reflective mirror 22, such as, for example, an index matched epoxy may be used.

There are several alternatives to this process, which are known to those of ordinary skill in the art, and will not be mentioned here.

Clearly, the embodiments illustrated in FIGS. 1–10 are meant to illustrate the use and fabrication of optical reflecting devices 20 and 30, which increases the rotational angle of a reflected beam while maintaining the switching voltage. The increased angle allows more flexibility in a switch system design in which this optical reflecting device can be used. The whole switch system can be reduced in size by bringing the output channels closer to the rotating mirror. Or alternately, the channel spacing can be increased to reduce crosstalk between channels. By using what is shown and described herein, a switch fabricated with the optical reflecting devices 20 or 30 will now have increased movemental angle with lower signal to noise or smaller size. Those having ordinary skill in the art will therefore appreciate the benefit of employing an embodiment of optical reflecting device 20 (FIGS. 3–6) and for optical reflecting device 30 (FIGS. 7 and 8) for numerous and various applications, which require rotating reflecting devices, which will benefit from an increased angle of reflection upon movement. Such applications include optical switching systems for telecommunications, scanners for bar-code readers, laser printers and copiers, photonics and displays, in particular, for projection displays with a scanner.

Again, it is important to note that FIGS. 1–10 illustrate a specific application and embodiment of the present invention, and are therefore not intended to limit the scope of the present disclosure or claims to that which is presented therein. Upon reading the specification and reviewing the drawings hereof, it will become immediately obvious to those skilled in the art that myriad other embodiments are possible, and that such embodiments are contemplated and fall within the scope of the presently claimed invention.

What is claimed is:

1. An optical reflecting device for a system implementing a selective rotation of said optical reflecting device, said optical reflecting device comprising:

an optical refractor;
an optical reflector interfaced with said optical refractor;
wherein a light beam entering said optical reflecting device at a first rotation position is sequentially refracted by said optical refractor, reflected by said optical reflector and refracted by said optical refractor prior to exiting said optical reflecting device at a first exit angle relative to a normal axis of said optical reflector at the first rotation position;
wherein, in response to said optical reflecting device being rotated from the first rotation position to a second rotation position by a rotation angle, the light beam is sequentially refracted by said optical refractor, reflected by said optical reflector and refracted by said optical refractor prior to exiting said optical reflecting device at a second exit angle relative to the normal axis of said optical reflector at the first rotation position; and
wherein an absolute value of a difference between the first exit angle and the second exit angle is greater than twice an absolute value of the rotation angle.

2. The optical reflecting device of claim 1, wherein said optical refractor is a prism.

3. The optical reflecting device of claim 1, wherein said optical reflector is a reflective mirror.

4. The optical reflecting device of claim 1, wherein said optical reflector is a silicon surface.

5. The optical reflective device of claim 1, further comprising:

an anti-reflective coating applied to said optical refractor.

6. A method of operating an optical reflecting device receiving a light beam, the method comprising:

at a first rotation position of the optical reflecting device, sequentially refracting the light beam upon entering the optical reflecting device, reflecting the light beam within the optical reflecting device, and refracting the light beam upon exiting the optical reflecting device,
wherein the light beam exits the optical reflecting device at a first exit angle relative to a normal axis of the optical reflecting device at the first rotation position;
rotating the optical reflective device from the first rotation position to a second rotation position by a rotation angle; and
at the second rotation position of the optical reflecting device, sequentially refracting the light beam upon entering the optical reflecting device, reflecting the light beam within the optical reflecting device, and refracting the light beam upon exiting the optical reflecting device,
wherein the light beam exits the optical reflecting device at a second exit angle relative to a normal axis of the optical reflecting device at the first rotation position, and
wherein an absolute value of a difference between the first exit angle and the second exit angle is greater than twice an absolute value of the rotation angle.

7. An optical switch, comprising:

a rotating mechanism operable to be rotated between a first position and a second position; and
an optical reflecting device affixed to said rotating mechanism to be concurrently rotated between the first position and the second position, said optical reflecting device including
an optical refractor,
an optical reflector interfaced with said optical refractor, wherein a light beam entering said optical reflecting device at a first rotation position is sequentially refracted by said optical refractor, reflected by said optical reflector and refracted by said optical refractor prior to exiting said optical reflecting device at a first exit angle relative to a normal axis of said optical reflector at the first rotation position, wherein, in response to said optical reflecting device being rotated from the first rotation position to the second rotation position by a rotation angle, the light beam is sequentially refracted by said optical refractor, reflected by said optical reflector and refracted by said optical refractor prior to exiting said optical reflecting device at a second exit angle relative to the normal axis of said optical reflector at the first rotation position, and wherein an absolute value of a difference between the first exit angle and the second exit angle is greater than twice an absolute value of the rotation angle.

8. The optical switch of claim 7, wherein said optical refractor is a prism.

9. The optical switch of claim 7, wherein said optical reflector is a reflective mirror.

10. The optical switch of claim 7, wherein said optical reflector is a silicon surface.

11. The optical switch of claim 7, further comprising:
    an anti-reflective coating applied to said optical refractor.

12. The optical switch of claim 11, wherein said top surface of said rotating mechanism to which said optical reflecting device is affixed is a silicon surface.

13. The optical switch of claim 7, wherein said rotation mechanism is a cantilever beam.

14. The optical switch of claim 7, wherein said optical reflector interfaced with said optical refractor is the top surface of said rotating mechanism to which said optical reflecting device is affixed.

* * * * *